United States Patent [19]

Iwama

[11] Patent Number: 5,052,218
[45] Date of Patent: Oct. 1, 1991

[54] TIRE UNIFORMITY INSPECTING MACHINE

[75] Inventor: Atsuaki Iwama, Kobe, Japan

[73] Assignee: Kabushiki Kaisha Kobe Seiko Sho, Kobe, Japan

[21] Appl. No.: 574,812

[22] Filed: Aug. 30, 1990

[30] Foreign Application Priority Data

Aug. 30, 1989 [JP] Japan .................................. 1-225694

[51] Int. Cl.$^5$ ......................................... G01M 17/02
[52] U.S. Cl. .................................................. 73/146
[58] Field of Search ........................................ 73/146

[56] References Cited

U.S. PATENT DOCUMENTS

| 4,004,693 | 1/1977 | Tsuji et al. | 73/146 |
| 4,078,339 | 3/1978 | Ongaro | 73/146 |
| 4,846,334 | 7/1989 | Cargould | 73/146 |
| 4,870,858 | 10/1989 | Smith et al. | 73/146 |

Primary Examiner—Donald O. Woodiel
Attorney, Agent, or Firm—Oblon, Spivak, McClelland, Maier & Neustadt

[57] ABSTRACT

A tire uniformity inspecting machine includes a framework constructed by setting first, second and third columns upright in a triangular arrangement and fixedly joining a substantially triangular top plate to the respective upper ends of the first, second and third columns, a tire conveying device for conveying a tire to and ejecting the same from the framework, tire driving device for driving the tire for rotation, a tire lifting device disposed under the tire conveying device to lift a tire held on the tire conveying device toward the tire driving device, and an artificial road member provided on the top plate so as to be brought into contact with the outer circumference of the tire rotated by the tie driving device. The triangular configuration of the framework facilitates tire uniformity inspecting operations and facilitates the use of overhead crane for changing a rim assembly for holding the tire for uniformity inspection. The triangular arrangement of the first, second and third columns facilitates the disposition and operation of a grinding machine for correcting the shape of the tire.

8 Claims, 14 Drawing Sheets

TIRE UNIFORMITY INSPECTING MACHINE

BACKGROUND OF THE INVENTION

1. Field of the Invention

The present invention relates to a tire uniformity inspecting machine to be used on a tire manufacturing line for manufacturing tires for automobiles and the like to inspect the rigidity, thickness uniformity and roundness of tires.

2. Description of the Related Art

Japanese Patent Publication (Kokoku) No. 47-7562 discloses techniques relating to a tire uniformity inspecting machine, Japanese Patent Publication (Kokoku) No. 63-48699 discloses techniques for rim fitting and removal on a tire uniformity inspecting machine, and Japanese Utility Model Laid-open (Kokai) No. 63-112021 discloses a grinding machine for a tire uniformity inspecting machine.

As shown in FIGS. 14 and 15, these prior art tire uniformity inspecting machines have frameworks 1 of the same construction, respectively. The framework 1 is constructed by fastening the upper end of four columns 2 set upright on a base to a top plate 3, and a rim fitting table 6 is mounted on the framework 1 so as to he moved between a rim fitting position 4 and a rim changing position 5. In this configuration, the space over the rim changing position 5 is covered with the top plate 3. Therefore, it is impossible to use an overhead crane or the like for removing a rim assembly, i.e., a combination of a lower spindle and upper and lower rims, at the rim changing position 5, and hence a special jig must be employed for removing the rim assembly.

Most recent tire uniformity inspecting machines are equipped with auxiliary machines including a grinding machine for correcting the shoulder of the tire. The tire uniformity inspecting machine shown in FIG. 15 is provided with a grinding machine 7 on the column 2. The grinding machine 7 must be disposed within a vertical range 8 to secure a safe distance 9 between the top plate 3 and the grinding machine 7, which requires an increase in the overall height of the tire uniformity inspecting machine.

SUMMARY OF THE INVENTION

Accordingly, it is a first object of the present invention to provide a tire uniformity inspecting machine facilitating the use of an overhead crane in inspecting tires.

A second object of the present invention is to provide a tire uniformity inspecting machine having a sufficient space available for incorporating a grinding machine.

In one aspect of the present invention, a tire uniformity inspecting machine comprises a framework constructed by setting first, second and third columns upright in a triangular arrangement and fixedly joining a top plate to the respective upper ends of the first, second and third columns; tire conveying means for conveying a tire to and ejecting the same from the framework; tire driving means disposed substantially in the central portion of the top plate; tire lifting means disposed under the tire conveying means to lift a tire held on the tire conveying means toward the tire driving means; and an artificial road member provided on the top plate so as to be brought into contact with the outer circumference of the tire rotated by the tire driving means; wherein a portion of the top plate extending over the first and second columns and the tire driving means has a substantially triangular shape, and a portion of the top plate extending over the tire driving means and the third column has a substantially linear shape.

A grinding machine may be provided on the third column of the tire uniformity inspecting machine so as to be moved toward and away from the circumference of the tire.

The framework consisting of the three columns and the top plate is lighter than that of the conventional tire uniformity inspecting machine having four columns, has less components than the conventional tire uniformity inspecting machine, and is economically advantageous in transportation and installation. The triangular arrangement of the three columns secures a sufficiently rigid, lightweight framework.

Since the artificial road member is disposed between the first and second columns, and the third column is placed on the perpendicular bisector of the line extending between the first and second columns, the installation of the heavy artificial road member does not affect the rigidity of the framework.

Since the top plate has a substantially triangular main portion and a substantially rectangular portion and a free space is formed over the rim changing position, an existing overhead crane or a simple lifting gear can be used for changing the rim assembly.

The grinding machine supported on the third column substantially on the perpendicular bisector of the line extending between the first and second columns can be moved most appropriately relative to the tire, and the triangular arrangement of the first, second and third columns provides a sufficient space available for supporting the grinding machine on the framework.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

First Embodiment

Figure 1:
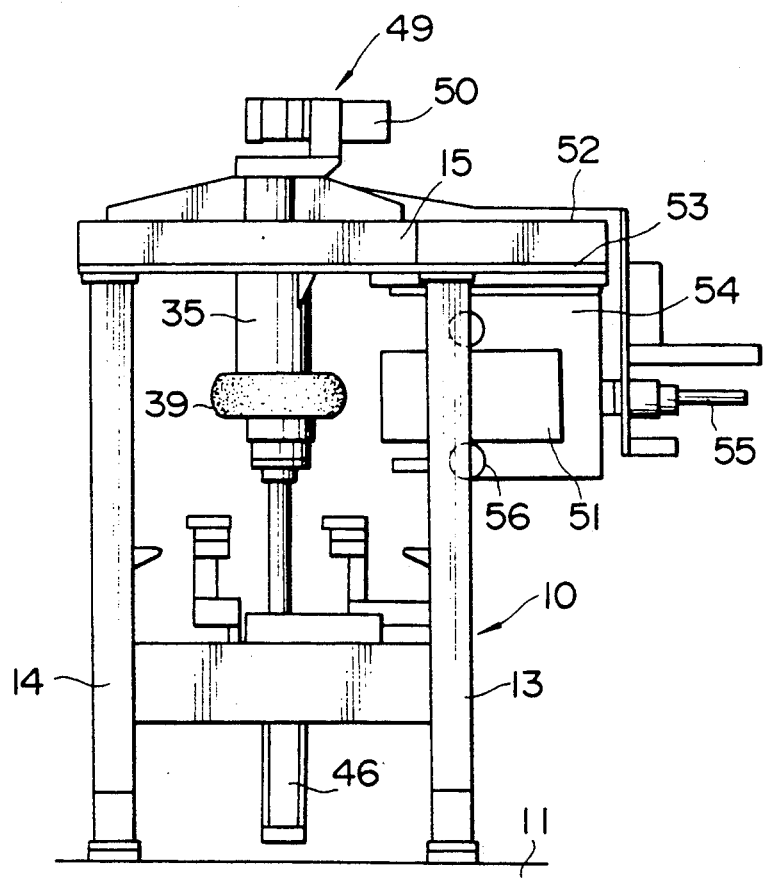
FIGS. 1, 2 and 3 are a side elevation, a plan view and a front view, respectively, of a tire uniformity inspecting machine in a preferred embodiment according to the present invention.
Figure 2:
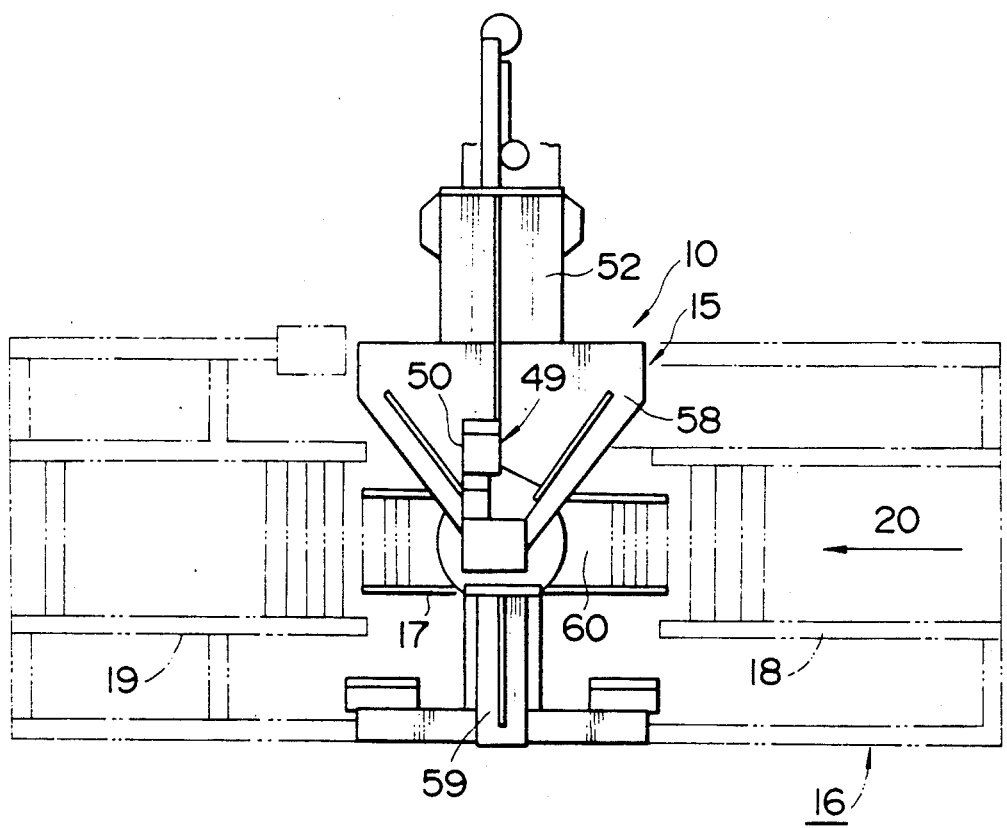
Figure 3:
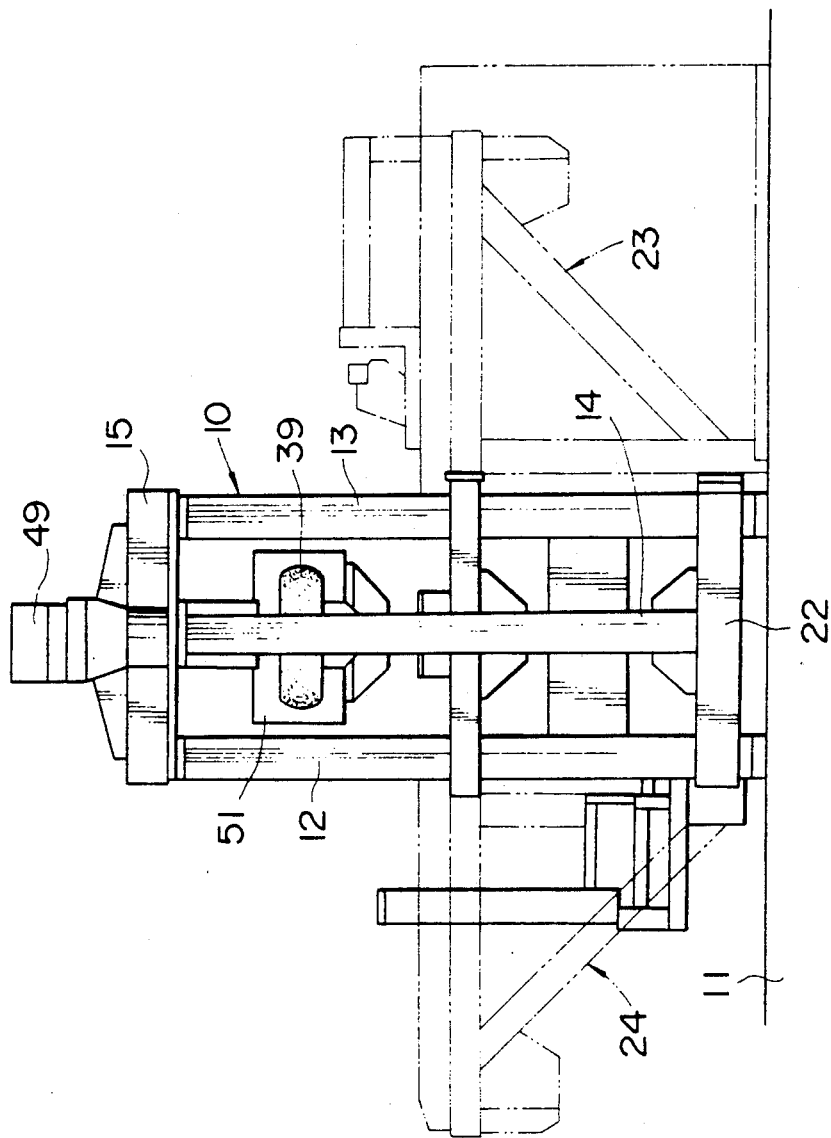

Referring to FIGS. 1 to 3, a framework 10 is constructed by setting a first column 12, a second column 13 and a third column 14 upright on a base 11, and fixedly joining a top plate 15 to the respective upper ends of the columns 12, 13 and 14. A tire conveying mechanism 16 comprises an intermediate roller conveyor 17 provided on the framework 10, a feed roller conveyor 18 and an ejecting roller conveyor 19. The tire conveying mechanism 16 conveys a test tire horizontally in the direction of an arrow 20 (FIG. 2). The tire conveying mechanism 16 is provided with a centering mechanism, not shown. The intermediate roller conveyor 17 is driven for positive conveyance and is provided with an opening 21.

Figure 5:
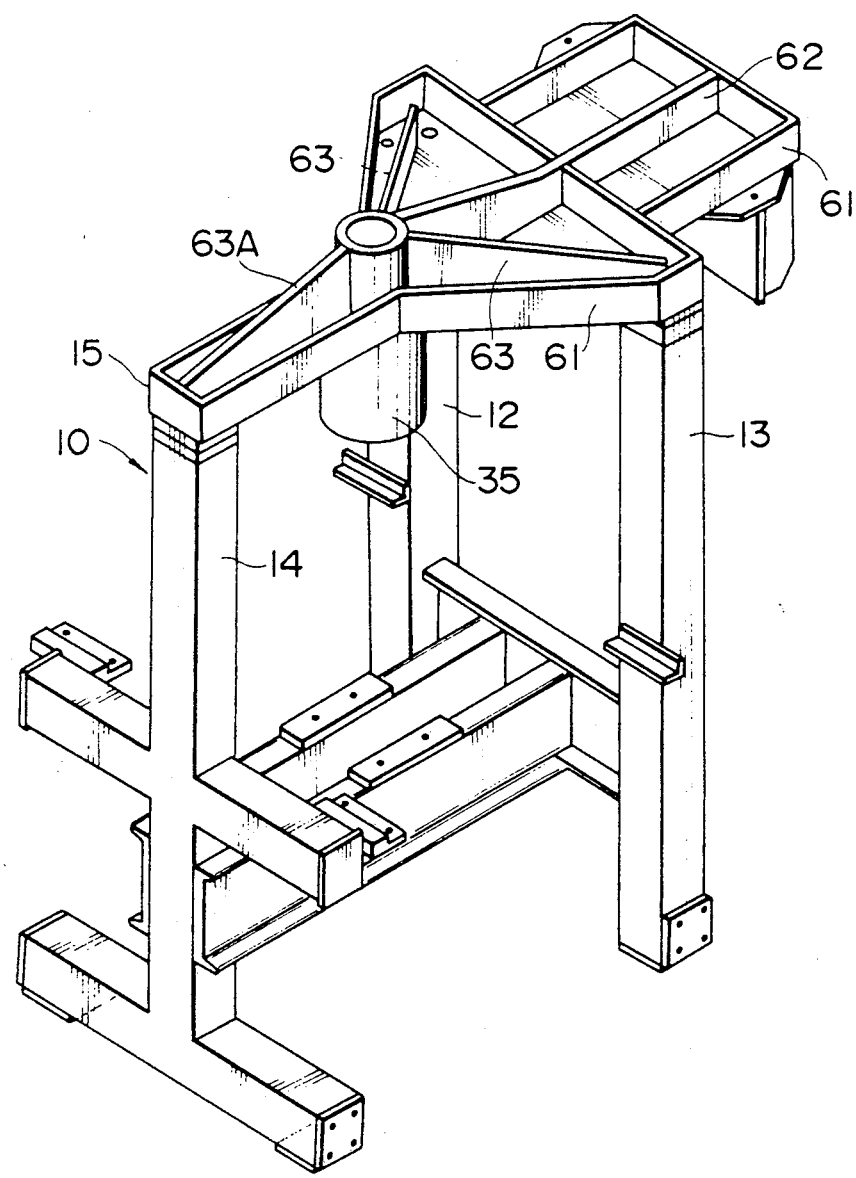
FIG. 5 is a perspective view of a framework employed in the tire uniformity inspecting machine of FIGS. 1 to 3.
Figure 6:
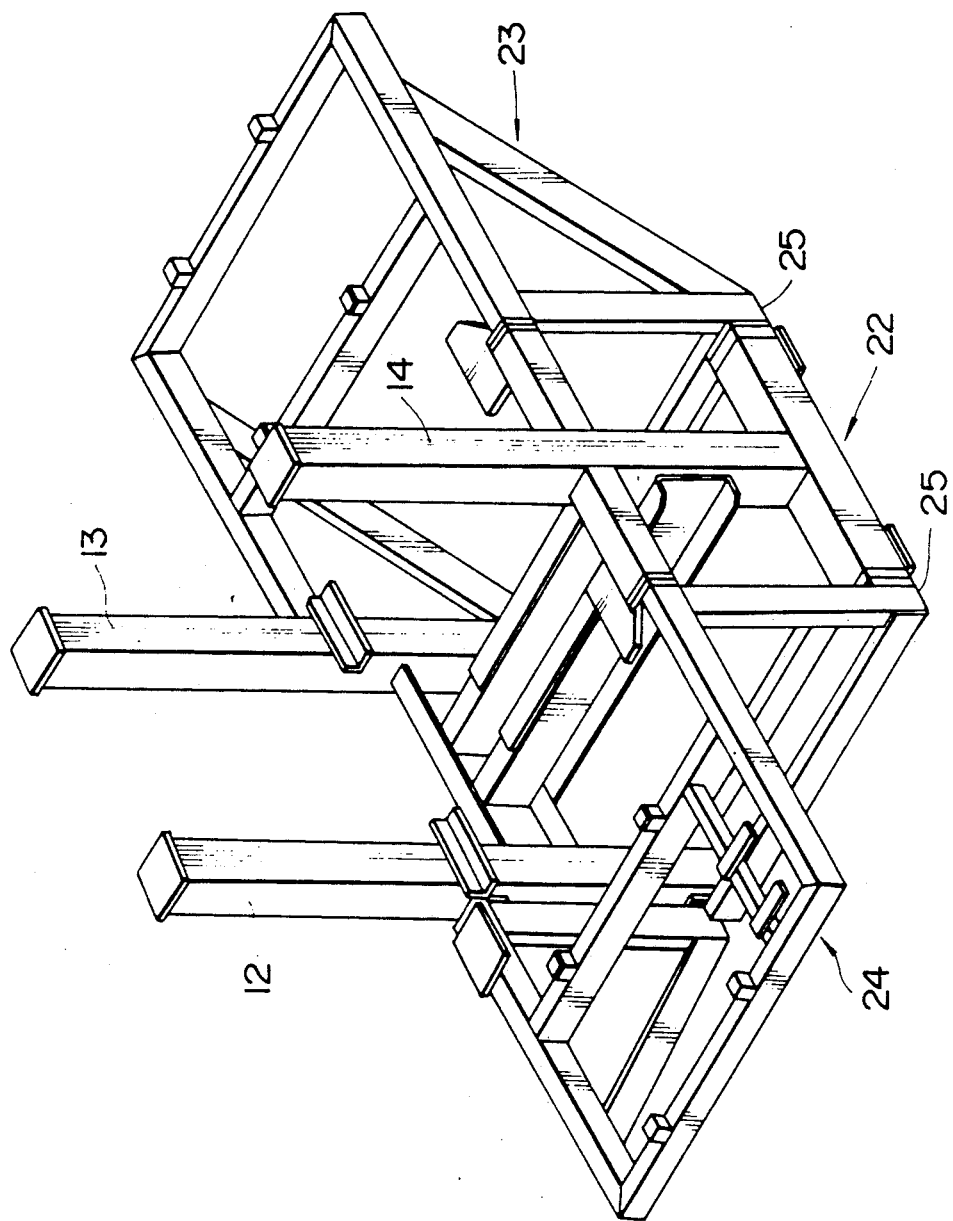
FIG. 6 is a perspective view of an assembly of columns and conveyor support frame.

As best shown in FIGS. 5 and 6, the framework 10 has a rectangular base frame 22 joined to the respective lower ends of the first column 12, the second column 13 and the third column 14. A support frame 23 for supporting the feed roller conveyor 18 is joined detachably to the front end of the base frame 22. A support frame 24 for supporting the ejecting roller conveyor 19 is attached detachably to the rear end of the base frame 22.

Figure 4:
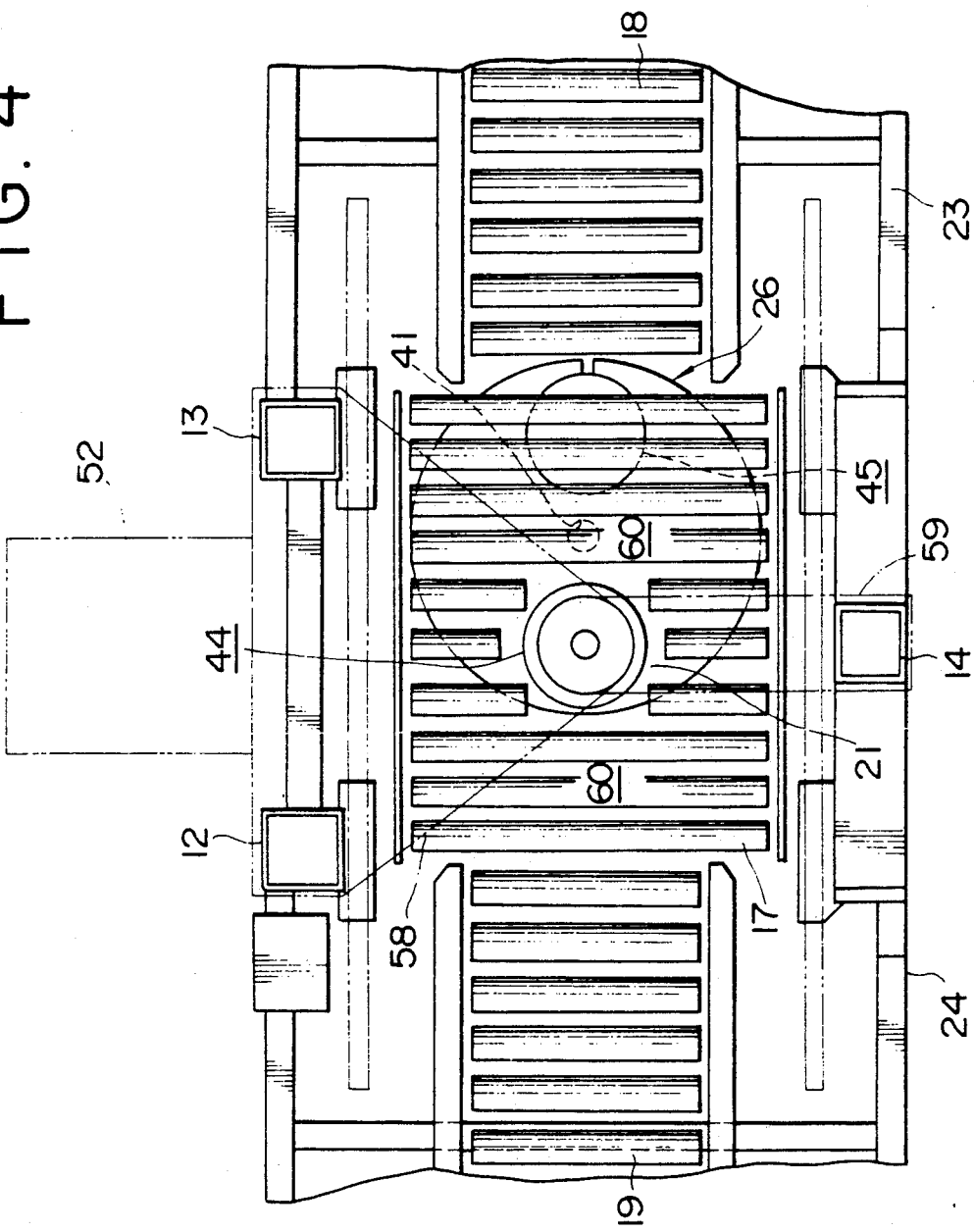
FIG. 4 is a sectional plan view of an essential portion of the tire uniformity inspecting machine of FIGS. 1 to 3.
Figure 9:
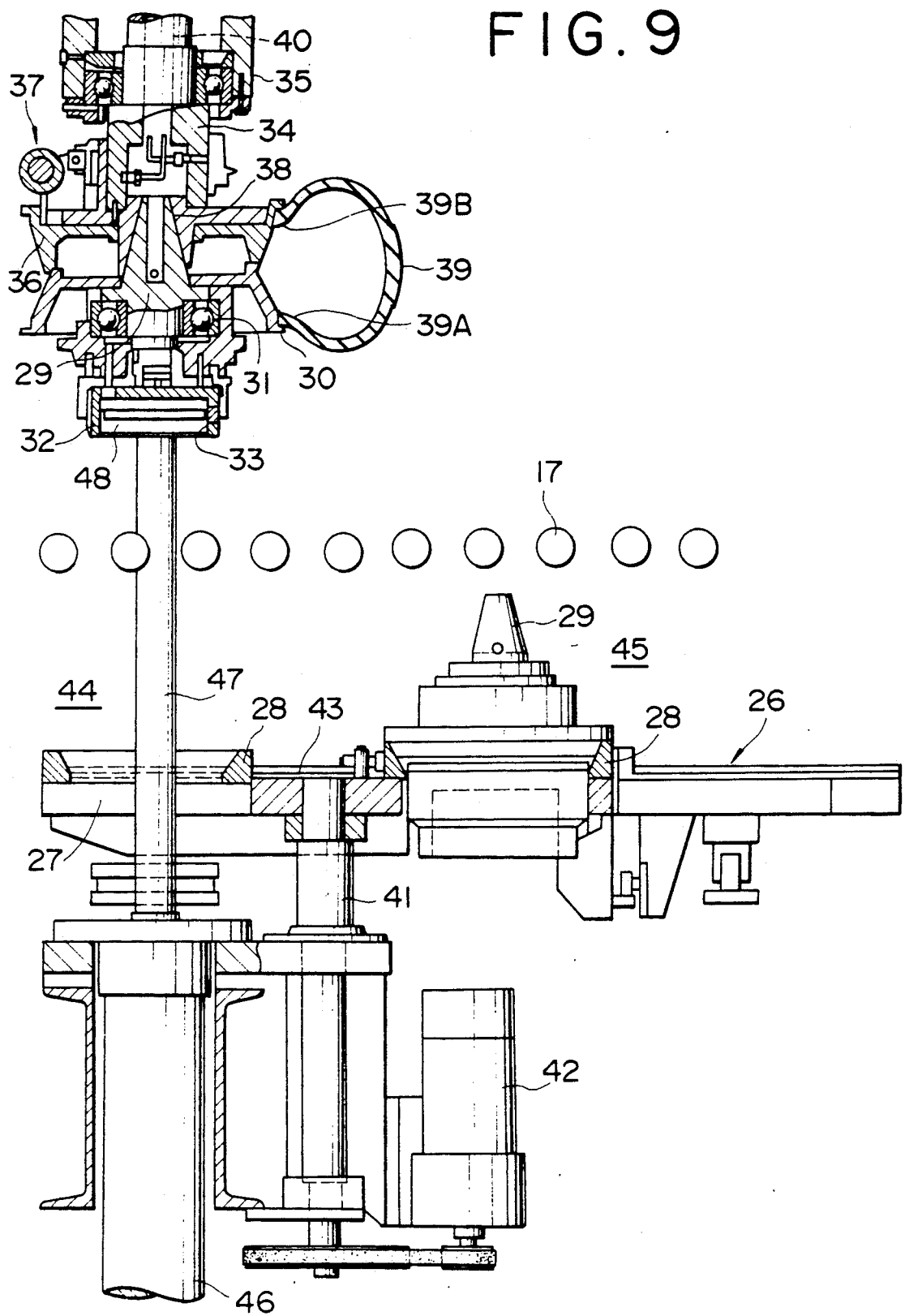
FIG. 9 is a sectional side elevation of assistance in explaining a rim fitting operation.

As shown in FIGS. 4 and 9, a rim fitting table 26 of a turntable type having a turntable 43 provided with a plurality of holding holes 27 is disposed under the tire conveying mechanism 16. As shown in FIG. 9, a support ring 28 is disposed on the turntable coaxially with the holding hole 27. A rim assembly consisting of a lower spindle 29, a lower rim 30 and associated parts is mounted on the support ring 28. The lower spindle 29 is supported in a bearing 31 for rotation on a holder 32. The holder 32 has a bottom recess 33.

As shown in FIGS. 5 and 9, a bearing cylinder 35 is provided on the top plate 15 at a position corresponding to the middle of the tire conveying mechanism 16 with respect to the width of the tire conveying mechanism, and an upper spindle 34 is supported in the bearing cylinder 35. An upper rim 36 is joined detachably to the upper spindle 34 by a locking mechanism 37. As shown in FIG. 9, the upper spindle 34 and the lower spindle 29 are held coaxially, and the upper taper end of the lower spindle 29 fits the taper hole 38 of the upper spindle 34. A lower rim 30 engages the lower bead 39A of a tire 39 and an upper rim 36 engages the upper bead 39B of the tire 39 to hold the tire 39 between the lower rim 30 and the upper rim 36. Air is supplied through an air inlet bore 40 formed in the upper spindle 34 into the tire 39 to fill up the tire 39 with air, and then the upper spindle 34 is driven for rotation about its axis to rotate the tire 39 about its axis.

The rim fitting table 26 of a turntable type shown in FIGS. 4 and 9 is provided with a motor 42 for driving a shaft 41 supporting the turntable 43 at its upper end. The turntable 43 is turned by the motor 42 to shift each holding hole 27 between a rim fitting position 44 where the holding hole 27 is aligned with the axis of the upper spindle 34 and a rim changing position 45 where the tire 39 is removed from the rim assembly.

Figure 10:
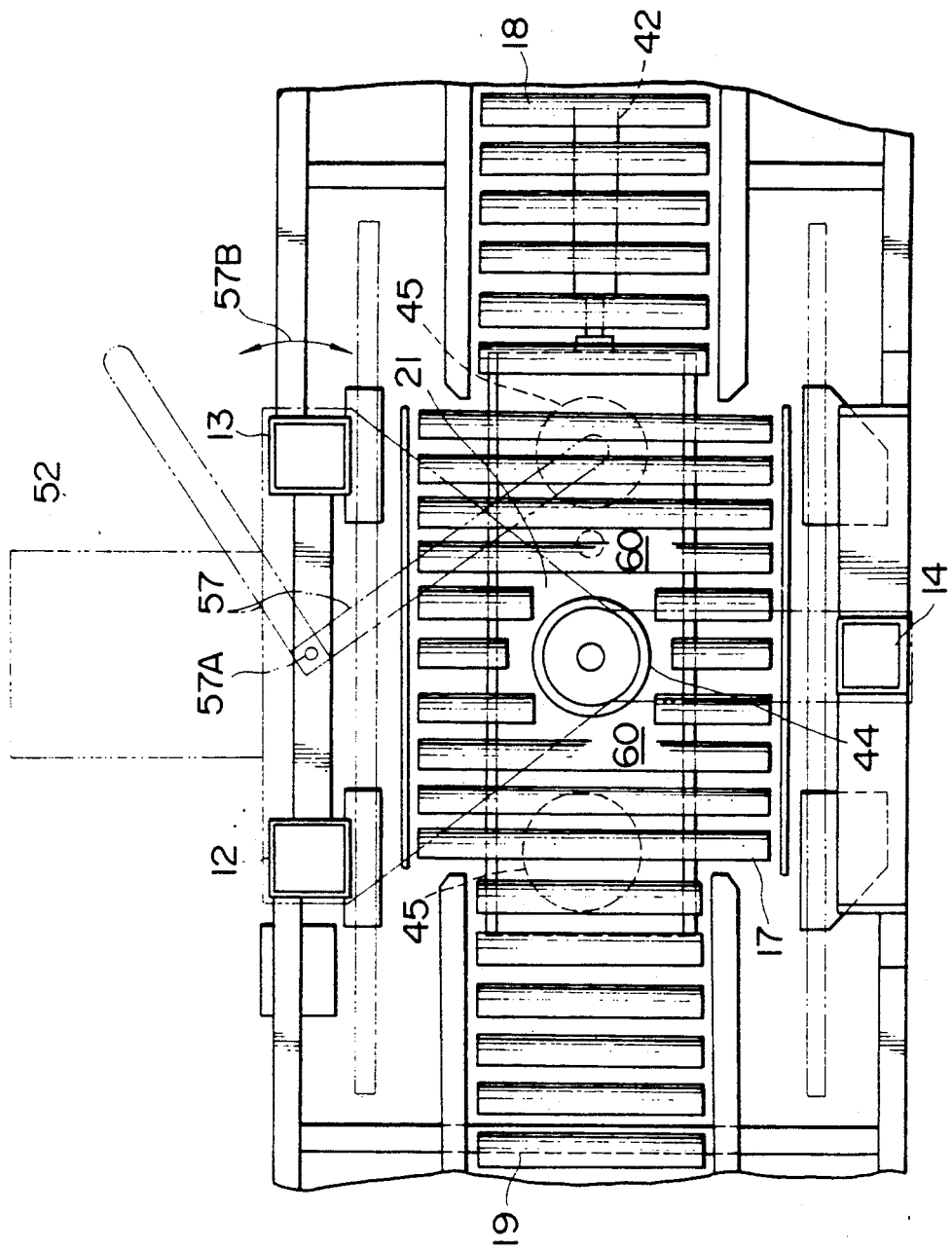
FIG. 10 is a sectional plan view of an essential portion of a modification of the tire uniformity inspecting machine of FIGS. 1 to 3.

The rim fitting table 26 may be of a slide table type as shown in FIG. 10. The rim fitting table 26 of a slide table type has a slide table provided with holding holes 27. The slide table is moved horizontally by a cylinder actuator 42 to shift each holding hole 27 between the rim fitting position 44 and the rim changing position 45. The cylinder actuator 42 may be substituted by a rack-and-pinion mechanism.

Referring to FIG. 9, a lifting mechanism 46 includes a cylinder actuator having a piston rod 47 and disposed under the rim fitting table 26 in a vertical position at a position corresponding to the rim fitting position 44. A head member 48 having the shape of a disk fitting the bottom recess 33 of the lower spindle 29 is attached to the upper end of the piston rod 47. The piston rod 47 is extended upward through the holding hole 27 to fit the head member 48 in the bottom recess 33 of the lower spindle 29.

As shown in FIGS. 1 to 3 and 7, a tire driving unit 49 comprises a motor 50 mounted on the top plate 15. The tire driving unit 49 drives the upper spindle 34 for rotation to rotate the tire 39 held between the upper rim 36 and the lower rim 30 about its axis.

Figure 7:
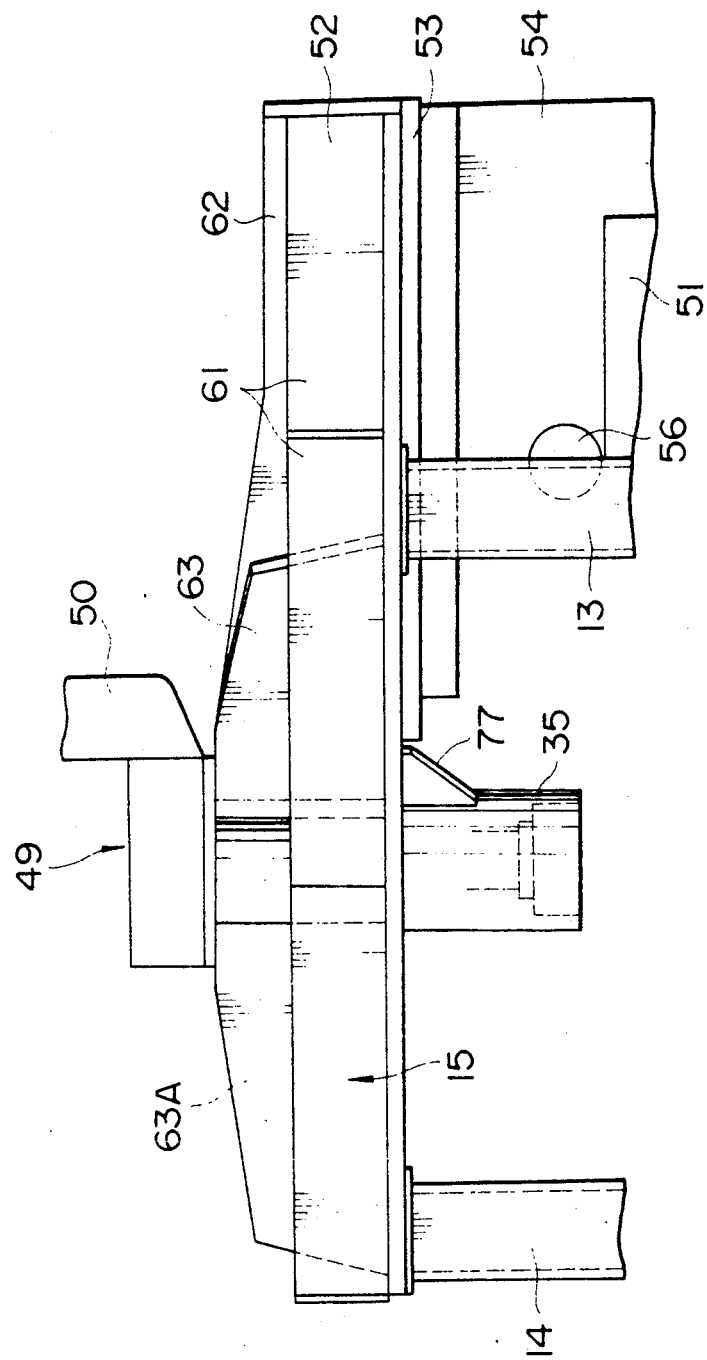
FIG. 7 is a side elevation of a top plate.

As shown in FIGS. 1 and 7, an artificial road member 51 is held for rotation on a holder 54, the holder 54 is slidably supported on a slide guide 53 attached to the lower surface of an extension 52 of the top plate 15, and the holder 54 is moved toward and away from the tire 39 by a screw shaft 55 to bring the artificial road member 51 into contact with the outer circumference of the tire 39 and to separate the artificial road member 51 from the tire 39. Load cells 56 are provided on the opposite sides of the artificial road member 51.

The first column 12, the second columns 13 and the third columns 14 are hollow rectangular members. The first column 12 and the second column 13 are disposed on the side of the artificial road member 51 with an interval with respect to the conveying direction of the tire conveying mechanism 16. The third column 14 is disposed on the perpendicular bisector of a line between the first column 12 and the second column 13, on the side opposite the side on which the artificial road member 51 is disposed.

Figure 8:
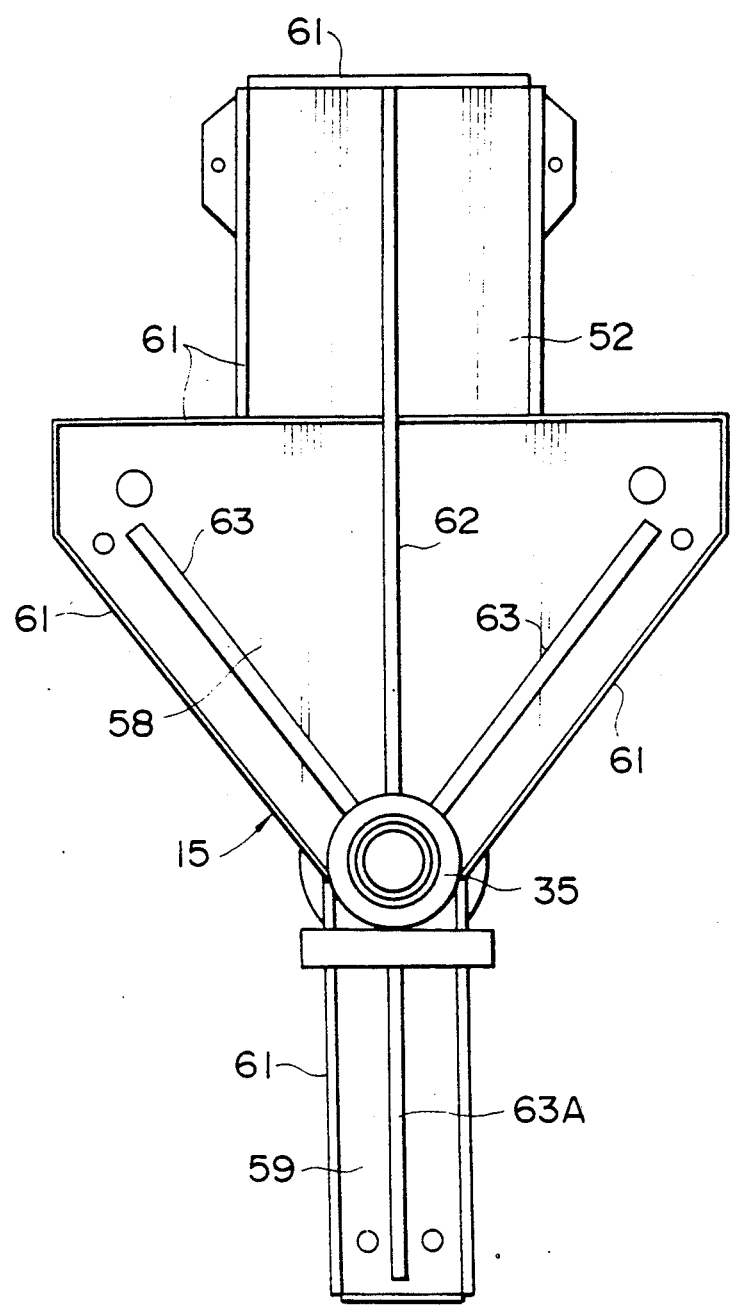
FIG. 8 is a top plan view of the top plate of FIG. 7.

As shown in FIG. 8, the main portion 58 of the top plate 15 having the extension 52, extending over the first column 12, the second column 13 and the bearing tube 35 has a substantially triangular shape and a portion 59 of the top plate 15, extending over the third column 14 and the bearing tube 35 has a substantially rectangular shape. Thus, free spaces 60 which are not covered with the top plate 15 are formed on the opposite sides of the rim changing position 45 on the rim fitting table 26 to facilitate a rim fitting operation and a rim changing operation. The extension 52, main portion 58 and rectangular portion 59 of the top plate 15 are constructed by welding flat plates, such as steel plates. The top plate 15 is rimmed by vertical walls 61 formed of flat plates, such as steel plates. As shown in FIG. 8, the top plate 15 is reinforced by ribs 62, 63 and 63A formed of flat plates, such as steel plates.

Figure 11:
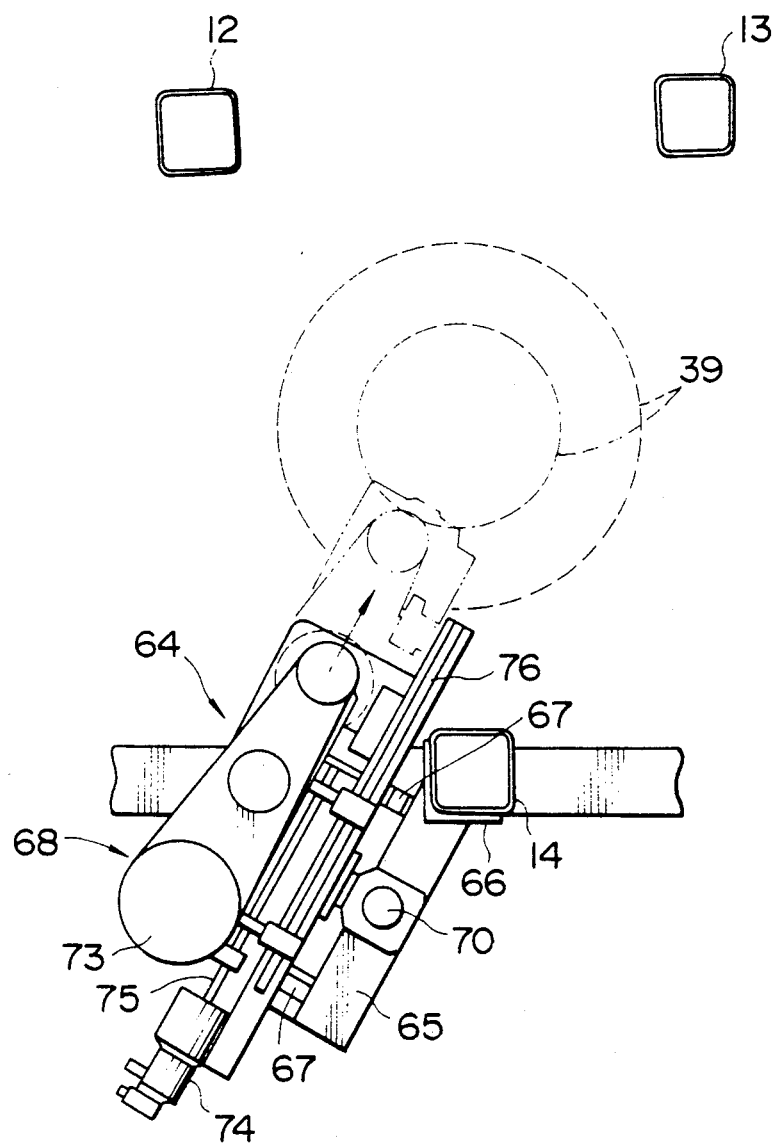
FIG. 11 is a plan view of an essential portion of the tire uniformity inspecting machine provided with a grinding machine.
Figure 12:
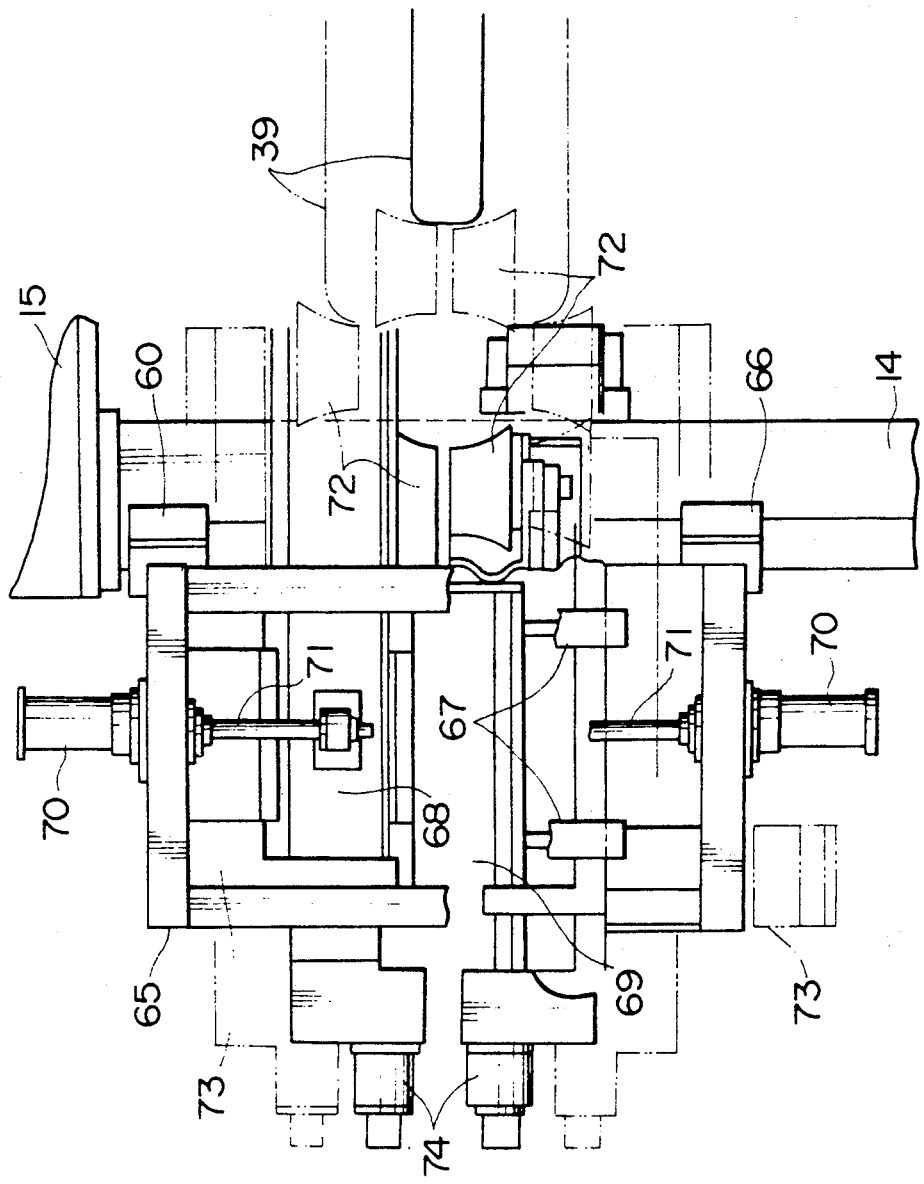
FIG. 12 is a side elevation of the tire uniformity inspecting machine equipped with the grinding machine.

FIGS. 11 and 12 show a grinding machine 64 combined with the tire uniformity inspecting machine. A support frame 65 is fastened to upper and lower brackets 66 fixed to the third column 14. An upper grinding unit 68 and a lower grinding unit 69 are supported on the support frame 65 so as to be moved vertically along guide rails 67 by driving mechanisms each including a motor 70 and a screw shaft 71 to adjust the respective vertical positions of grinding wheels 72 according to the width of the tire 39 as shown in FIG. 12. The grinding wheels 72 of the grinding units 68 and 69 are driven for rotation respectively by motors 73. The grinding wheels 72 are moved horizontally along guide rails 76 by driving mechanisms each including a motor 74 and a screw shaft 75 to adjust the respective horizontal positions of the grinding wheels 72 according to the outside diameter of the tire 39. The shoulders of the tire 39 are ground properly by the grinding wheels 72.

The upper ends of the first column 12, the second column 13 and the third column 14 are joined fixedly to the top plate 15 by means of flanges and bolts. The junction of the top plate 15 and the bearing tube 35 is reinforced by gusset plates 77.

Figure 13:
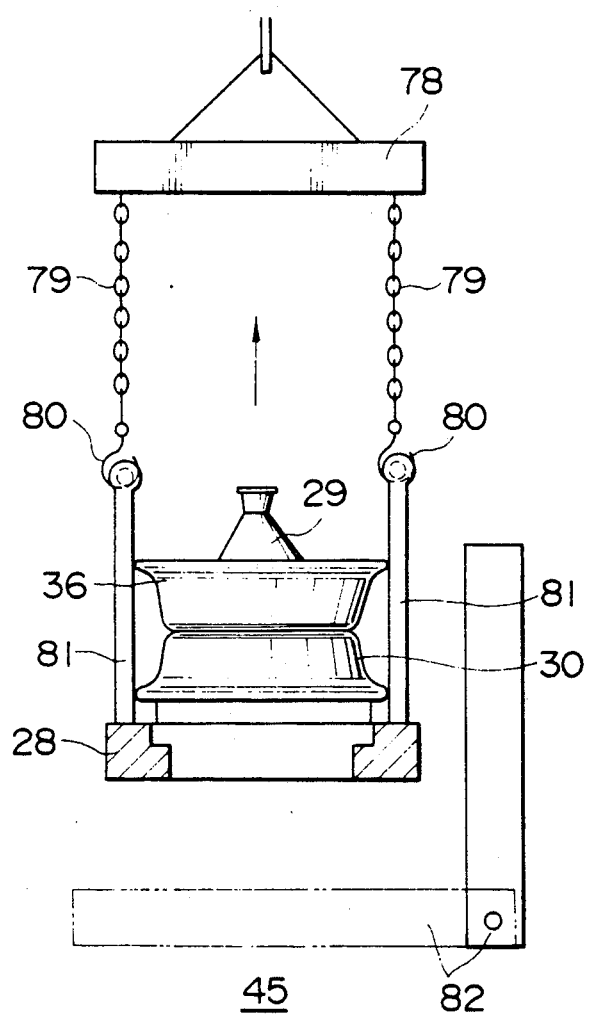
FIG. 13 is a side elevation of assistance in explaining a rim changing operation.
Figure 14:
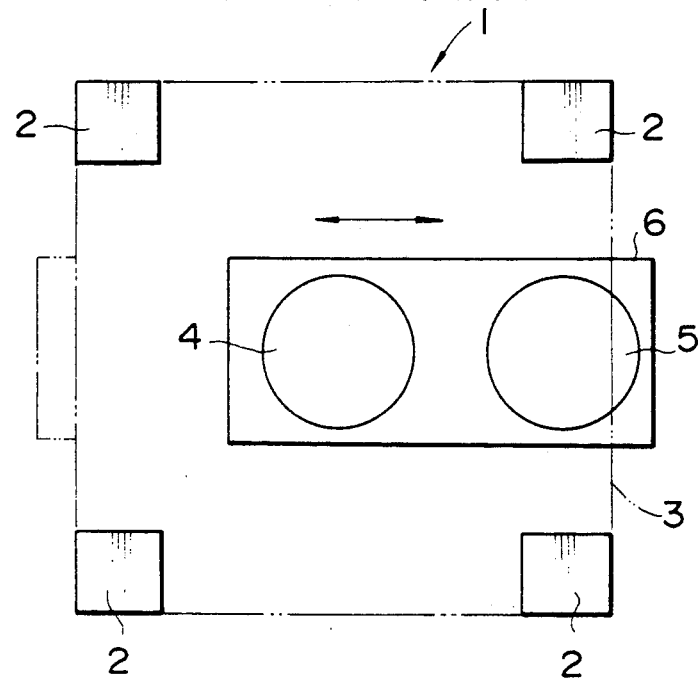
FIGS. 14 and 15 are plan view and a side elevation, respectively, of a conventional tire uniformity inspecting machine.
Figure 15:
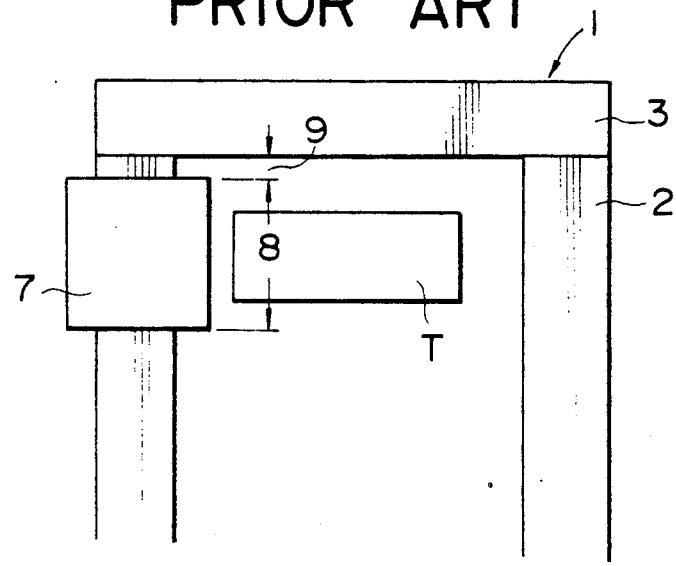

As shown in FIG. 13, lifting rods 81 are screwed in the support ring 28, and hooks 80 attached to the free ends of the chains 79 of an overhead crane 78 are hooked to the lifting rods 81 in removing the rim assembly from the tire uniformity inspecting machine. A section 82 of the intermediate roller conveyor 17 can be raised in a vertical position for removing the rim assembly from the rim fitting table 26.

In operation, the tire 39 is fed to the tire uniformity inspecting machine in the direction of the arrow 20 (FIG. 2), the tire 39 is aligned with the opening 21 of the intermediate roller conveyor 17, and the lifting mechanism 46 lifts up the rim assembly mounted on the support ring 28 of the rim fitting table 26 to fit the upper rim 36 and the lower rim 30 in the tire 39 so that the tire 39 is held between the upper rim 36 and the lower rim 30 as shown in FIG. 9. The upper rim 36, the lower rim 30 and the tire 39 may be assembled by a procedure as disclosed in Japanese Patent Publication (Kokoku) No. 63-48699. Subsequently, the tire driving unit 49 is actuated to rotate the tire 39 after inflating the tire 39 by air, and then the artificial road member 51 is pressed against the circumference of the tire 39 for inspection. After the inspection has been completed, the lifting mechanism 46 lowers the rim assembly together with the tire 39 to place the tire 39 on the intermediate roller conveyor 17, and then the intermediate roller conveyor 17 is driven to deliver the tire 39 to the subsequent process through the ejecting roller conveyor 19.

When the rim assembly needs to be replaced with another rim assembly of a different size to inspect tires of a different size, the support ring 28 supporting the rim assembly on the rim fitting table 26 at a position corresponding to the holding hole 27 is moved to the rim changing position 45, the section 82 of the intermediate roller conveyor 17 is raised in a vertical position, and then the support ring 28 mounted with the rim assembly is lifted up by the overhead crane 78 as shown in FIG. 13. The free spaces 60 formed on the front and rear sides of the top plate 15 obviates the interference of the top plate 15 with the overhead crane 78 and facilitates the rim changing operation.

Referring to FIG. 10, the tire uniformity inspecting machine may be provided with a rim changing mechanism including a swing arm 57 supported by a pivot shaft 57A on the top plate 15 for swing motion in directions indicated by a double arrow 57B, and lifting means held on the swing arm 57 to enable further quick and easy rim assembly changing operation.

When the results of inspection of the shape of the tire 39 require grinding the shoulders of the tire 39, the tire 39 held between the upper rim 36 and the lower rim 30 is rotated and the the pair of grinding wheels 72 of the grinding machine 64 are pressed against the shoulders of the tire 39 for grinding as shown in FIG. 12. The free space 60 on the opposite sides of the top plate 15 are available for mounting the grinding machine 64 on the framework without being interfered by the top plate 15 and enables the grinding wheels 72 to be moved linearly for grinding in an appropriate position.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A tire uniformity inspecting machine comprising:
    a framework constructed by setting first, second and third columns upright in a triangular arrangement and fixedly joining a top plate to the respective upper ends of the first, second and third columns;
    tire conveying means for conveying a tire to and ejecting the same from the framework;
    tire driving means disposed substantially in the central portion of the top plate;
    tire lifting means disposed under the tire conveying means to lift a tire held on the tire conveying means toward the tire driving means; and
    an artificial road member provided on the top plate so as to be brought into contact with the outer circumference of the tire rotated by the tire driving means;
    wherein a portion of the top plate extending over the first and second columns and the tire driving means has a substantially triangular shape, and a portion of the top plate extending over the tire driving means and the third column has a substantially linear shape.

2. A tire uniformity inspecting machine according to claim 1, including rim assembly changing means having a plurality of holding holes disposed under the tire conveying means, and the rim assembly changing means includes shifting means for shifting a rim assembly from a rim assembly changing position to a rim fitting position corresponding to the tire lifting means.

3. A tire uniformity inspecting machine according to claim 1, including a grinding means supported on the third column so as to be advanced toward and retracted from the outer circumference of the tire.

4. A tire uniformity inspecting machine comprising:
    tire conveying means for conveying a tire;
    first and second columns set upright at an interval along the conveying direction of the tire conveying means;
    an artificial road member disposed between the first and second columns so as to be brought into contact with the circumference of the tire;
    a third column disposed substantially on a perpendicular bisector of a line extending between the first and second column and opposite to the artificial road member;
    a connecting member interconnecting respective upper ends of the first, second and third columns;
    tire driving means for driving the tire for rotation and provided on the connecting member; and
    tire lifting means for lifting the tire held on the tire conveying means toward the tire driving means;
    wherein a portion of the connecting member extending over the tire driving means and the first and second columns is formed of structural members having a substantially triangular shape, and a portion of the connecting member extending over the tire driving means and the third column is formed of structural members having a substantially linear shape.

5. A tire uniformity inspecting machine according to claim 1 or 4, including an upper spindle having an upper rim and a lower spindle, having a lower rim, wherein the upper and lower rims engage beads of the tire to hold the tire.

6. A tire uniformity inspecting machine according to claim 4, including rim assembly changing means comprising a turntable provided with a plurality of holding holes, and rotative driving means for driving the turntable for rotation and disposed under the tire conveying means, wherein the turntable may be turned to shift a predetermined rim assembly from a rim assembly changing position to a rim fitting position corresponding to the tire lifting means.

7. A tire uniformity inspecting machine according to claim 4, including rim assembly changing means comprising a slide table provided with a plurality of holding holes, and shifting means for shifting the slide table and disposed under the tire conveying means, wherein the slide table may be moved to shift a predetermined rim assembly from a rim assembly changing position to a rim fitting position corresponding to the tire lifting means.

8. A tire uniformity inspecting machine according to claim 4, including a grinding machine for grinding the tire and supported for vertical movement on the third column, wherein the grinding machine comprises a pair of grinding units disposed one over the other, first driving means for advancing the grinding units toward and retracting the same from the outer circumference of the tire, and second driving means for vertically moving the grinding units.

* * * * *